US009240618B2

United States Patent
Yang (10) Patent No.: US 9,240,618 B2
(45) Date of Patent: Jan. 19, 2016

(54) RECHARGEABLE BATTERY AND BATTERY MODULE

(71) Applicant: Samsung SDI Co., Ltd., Yongin, Gyeonggi-do (KR)

(72) Inventor: Seo-Hoon Yang, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 370 days.

(21) Appl. No.: 13/841,480

(22) Filed: Mar. 15, 2013

(65) Prior Publication Data

US 2014/0045001 A1  Feb. 13, 2014

(30) Foreign Application Priority Data

Aug. 13, 2012  (KR) ......................... 10-2012-0088592

(51) Int. Cl.
*H01M 10/46* (2006.01)
*H01M 10/42* (2006.01)
*H01M 2/30* (2006.01)
*H01M 10/0525* (2010.01)

(52) U.S. Cl.
CPC ............ *H01M 10/425* (2013.01); *H01M 2/305* (2013.01); *H01M 10/0525* (2013.01); *Y02T 10/7011* (2013.01)

(58) Field of Classification Search
CPC . H01M 10/425; H01M 2/34; H01M 2200/00; H01M 2/206; H01M 2/204; H01M 2/202
See application file for complete search history.

(56) References Cited

U.S. PATENT DOCUMENTS

| 8,105,710 | B2 | 1/2012 | Kondou et al. |
| 2008/0299452 | A1* | 12/2008 | Nakazawa ................ 429/152 |
| 2010/0124693 | A1* | 5/2010 | Kosugi et al. .............. 429/92 |
| 2011/0008667 | A1* | 1/2011 | Kwag et al. ................ 429/123 |
| 2011/0045322 | A1* | 2/2011 | Baek et al. ................... 429/7 |
| 2011/0176883 | A1 | 7/2011 | Wienke et al. |
| 2011/0268996 | A1* | 11/2011 | Lee ............................ 429/7 |

FOREIGN PATENT DOCUMENTS

| JP | 11-145194 (A) | 5/1999 |
| JP | 2007-165139 (A) | 6/2007 |
| KR | 10-2011-0041485 (A) | 4/2011 |

* cited by examiner

*Primary Examiner* — Stewart Fraser
*Assistant Examiner* — Olatunji Godo
(74) *Attorney, Agent, or Firm* — Knobbe, Martens, Olson & Bear, LLP (57) ABSTRACT

A rechargeable battery is disclosed. In one aspect, the battery includes an electrode assembly comprising a positive electrode and a negative electrode, a case accommodating the electrode assembly and a terminal electrically connected to the electrode assembly and exposed from the case. The battery further includes a protective circuit module comprising a connecting member electrically connected to the terminal and an insulating member interposed between the terminal and the connecting member, wherein a plurality of openings are formed in the insulating member.

20 Claims, 11 Drawing Sheets

RECHARGEABLE BATTERY AND BATTERY MODULE

RELATED APPLICATIONS

This application claims priority to and the benefit of Korean Patent Application No. 10-2012-0088592 filed in the Korean Intellectual Property Office on Aug. 13, 2012, the entire contents of which are incorporated herein by reference.

BACKGROUND

1. Field

The described technology generally relates to a rechargeable battery and a battery module.

2. Description of the Related Technology

A rechargeable battery is a battery that can be repeatedly charged and discharged, unlike a primary battery. A small rechargeable battery is used as a power supply for small electronic devices such as cellular phones, notebook computers, and camcorders, while a medium or large rechargeable battery is used as a power supply for driving motors in hybrid vehicles and the like.

A large capacity high power rechargeable battery using a non-aqueous electrolyte with high energy density has been recently developed. The large capacity high power rechargeable battery is constructed with a high power battery module having a plurality of rechargeable cells coupled to each other in series or in parallel such that it can be used in electric vehicles requiring high power. Multiple cell batteries are often referred to as battery packs.

Furthermore, a high power rechargeable battery may have a cylindrical shape or a square shape.

SUMMARY

One inventive aspect is a rechargeable battery for improving a connection structure of a terminal, and a battery module.

Another aspect is a rechargeable battery for accurately detecting a connection status of a terminal and a protective circuit module, and a battery module.

Another aspect is a rechargeable battery including: an electrode assembly including a positive electrode and a negative electrode; a case for receiving the electrode assembly; a terminal electrically connected to the electrode assembly and protruded outside the case; a protective circuit module including a connecting member electrically connected to the terminal; and an insulating member provided between the terminal and the connecting member and having a plurality of openings.

The insulating member has a mesh form, and the insulating member is formed with a film in which pluralities of openings are formed.

The terminal has a plate or ring shape, and the insulating member is stuck to the terminal.

The connecting member has a plate, ring, or rod shape, and the insulating member is stuck to the connecting member.

The terminal and the connecting member are bonded through welding or soldering.

Another aspect is a battery module including: a plurality of rechargeable batteries; bus bar for electrically connecting the rechargeable batteries; a protective circuit module having a connecting member electrically connected to the bus bar; and an insulating member provided between the terminal and the connecting member and having a plurality of openings.

The insulating member has a mesh form, and the insulating member is formed with a film in which a plurality of openings are formed.

The terminal has a plate or ring shape, and the insulating member is stuck to the terminal.

The connecting member has a plate, ring, or rod shape, and the insulating member is stuck to the connecting member.

The terminal and the connecting member are bonded through welding or soldering.

Another aspect is a rechargeable battery comprising: an electrode assembly comprising a positive electrode and a negative electrode; a case accommodating the electrode assembly; a terminal electrically connected to the electrode assembly and exposed from the case; a protective circuit module comprising a connecting member electrically connected to the terminal; and an insulating member interposed between the terminal and the connecting member, wherein a plurality of openings are formed in the insulating member.

In the above battery, the insulating member is formed as a mesh. In the above battery, the insulating member is formed of a film in which a plurality of openings are formed. In the above battery, the terminal has a plate or ring shape. In the above battery, the insulating member is attached to the terminal. In the above battery, the connecting member has a plate, ring, or rod shape. In the above battery, the insulating member is attached to the connecting member. In the above battery, the terminal and the connecting member are bonded through welding or soldering.

Another aspect is a battery module comprising: a plurality of rechargeable batteries; a bus bar configured to electrically connect the rechargeable batteries; a protective circuit module comprising a connecting member electrically connected to the bus bar; and an insulating member interposed between the terminal and the connecting member, wherein a plurality of openings are formed in the insulating member.

In the above battery module, the insulating member is formed as a mesh. In the above battery module, the insulating member is formed of a film in which a plurality of openings are formed. In the above battery module, the terminal has a plate or ring shape. In the above battery module, the insulating member is attached to the terminal.

In the above battery module, the connecting member has a plate, ring, or rod shape. In the above battery module, the insulating member is attached to the connecting member. In the above battery module, the terminal and the connecting member are bonded through welding or soldering.

Another aspect is a rechargeable battery comprising: an electrode assembly; a terminal extending from the electrode assembly; a protective circuit module comprising a connecting member electrically connected to the terminal; and an insulating member at least part of which is interposed between the terminal and the connecting member, wherein at least one opening is formed in the insulating member.

In the above battery, the connecting member does not contact part of the openings. In the above battery, the terminal and connection member have substantially the same shape. In the above battery, the at least one opening comprises a plurality of openings, and wherein a soldering material is formed inside at least part of the openings.

DETAILED DESCRIPTION

A rechargeable battery generally includes a protective circuit module electrically connected to a terminal and controlling charging and discharging. The protective circuit module is generally fixed to the terminal through welding or soldering. A test may be performed before the protective circuit module is commercially delivered so as to check its operation state, and when the terminal and the protective circuit module are not fully connected but only contact each other, they can still be determined to be in a current applied state.

Hereinafter, embodiments will be described more fully hereinafter with reference to the accompanying drawings. As those skilled in the art would realize, the described embodiments may be modified in various different ways, all without departing from the spirit or scope of the present invention. Like reference numerals designate like elements throughout the specification.

Figure 1:
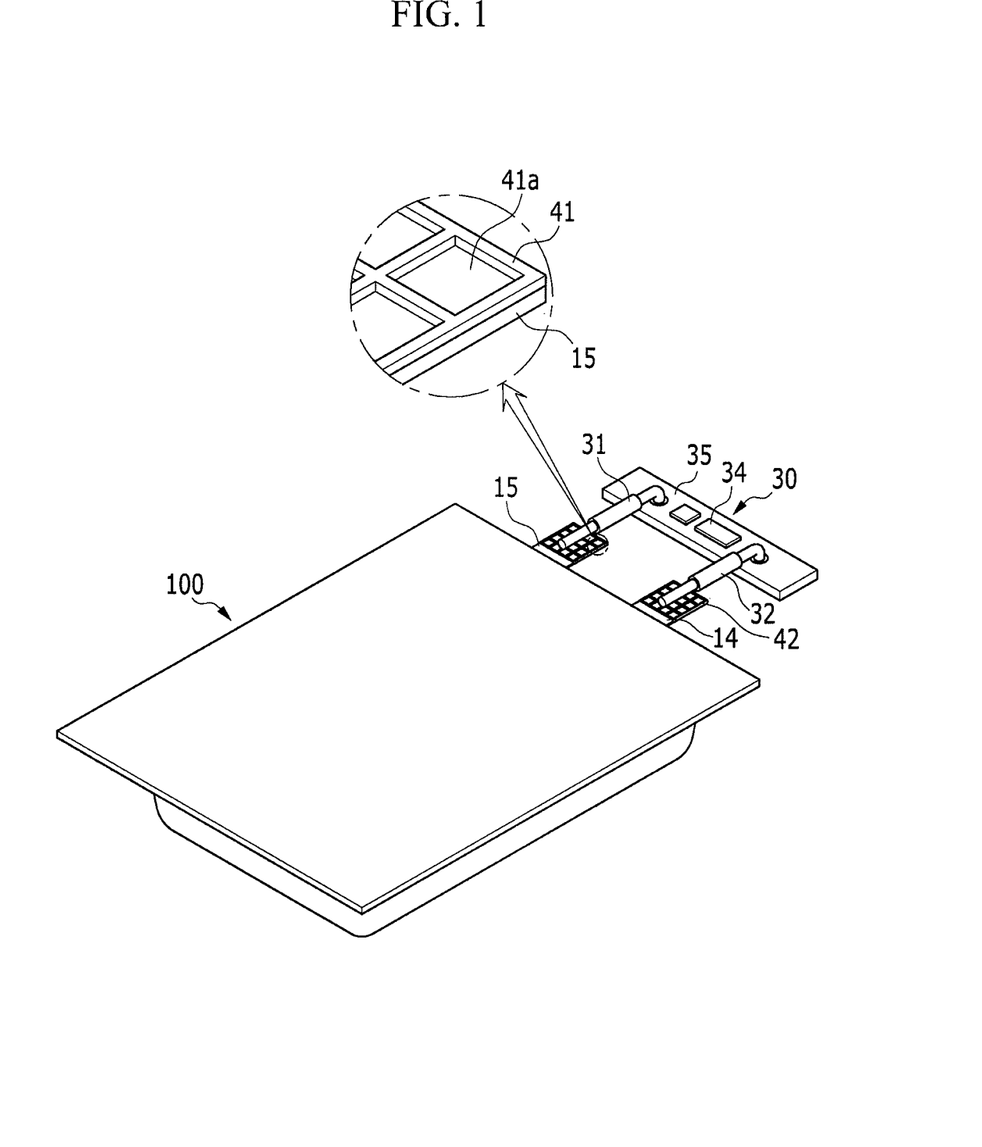
FIG. 1 shows a perspective view of a rechargeable battery according to a first embodiment.
Figure 2:
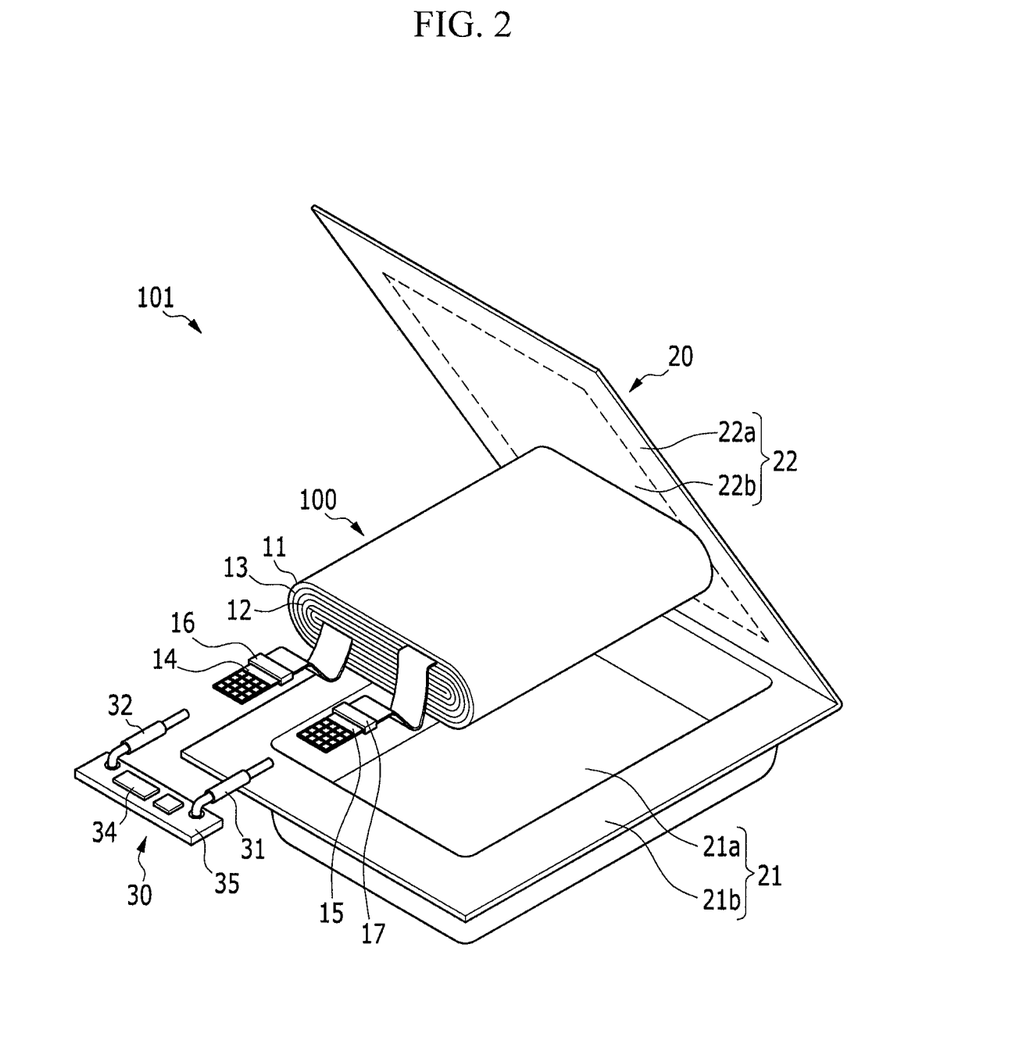
FIG. 2 shows an exploded perspective view of a rechargeable battery according to one embodiment.

FIG. 1 shows a perspective view of a rechargeable battery according to a first embodiment, and FIG. 2 shows an exploded perspective view of a rechargeable battery according to one embodiment.

Referring to FIG. 1 and FIG. 2, the rechargeable battery 101 includes an electrode assembly 100 having a separator 13 interposed between a first electrode 11 and a second electrode 12, a case 20 accommodating the electrode assembly 10, and a first terminal 15 and a second terminal 14 electrically connected to the electrode assembly 100. In one embodiment, the rechargeable battery 101 is a lithium-ion rechargeable battery.

In one embodiment, the first electrode 11 is a positive electrode and the second electrode 12 is a negative electrode. In this embodiment, the first electrode 11 is formed with a structure in which a positive active material is applied to a positive current collector, and the second electrode 12 is formed with a structure in which a negative active material is applied to a negative current collector. In one embodiment, the electrode assembly 100 has a structure in which the band-shaped first electrode 11 and the second electrode 12 are spirally wound with the separator 13 therebetween.

However, other configurations are possible, and the electrode assembly can have a structure in which a plurality of positive electrodes and negative electrodes are alternately stacked with the separator between them.

A positive uncoated region and a negative uncoated region are provided at an end of a first side of the electrode assembly 100, the first terminal 15 is electrically connected to the positive uncoated region, and the second terminal 14 is electrically connected to the negative uncoated region. Insulating layers 16 and 17 are formed to surround circumferences of the terminals 14 and 15 for the purpose of insulation from the case 20.

The case 20 according to the present embodiment has a pouch form, however, the case can be made of metal.

The case includes a body 21 and a cover 22. The body 21 includes a receiver 21a that is a space for receiving the electrode assembly 100, and a sealer 21b formed when an opening of the receiver 21a is extended and enlarged.

The cover 22 extends from an edge of the sealer 21b of the body 21. The cover 22 includes a receiver covering area 22a for covering the receiver 21a of the body 21 and corresponding to the receiver 21a of the body 21 while being sealed with the sealer 21b of the body 21, and a sealer 22b corresponding to the sealer 21b corresponding to the body 21.

In one embodiment, when the electrode assembly 100 is received into the receiver 21a of the body 21, the cover 22 is covered and adhered closely to it, and the sealer 21b of the body 21 and the sealer 22b of the cover 22 are sealed through, for example, thermal fusion bonding so the rechargeable battery 101 is provided. In one embodiment, the first terminal 15 and the second terminal 14 are exposed from the case 20.

The protective circuit module 30 includes a circuit substrate 35, and elements 34, a first connecting member 31, and a second connecting member 32 that are provided on a first surface of the circuit substrate 35. Also, the protective circuit module 30 includes outer terminals for connecting the rechargeable battery 101 to an external device on a second surface of the circuit substrate 35.

The circuit substrate 35 may be an insulating substrate. The circuit substrate 35 may include a connector such as wires (not shown) for electrically connecting the elements 34 and the first and second connecting members 31 and 32 that are provided on the circuit substrate 35.

The elements 34 can be IC elements for controlling the rechargeable battery 101 or protective temperature coefficient (PTC) elements for preventing a flow of overcurrent, and they control charging and discharging of the rechargeable battery 101.

The first and second connecting members 31 and 32 are connected to the first and second terminals 15 and 14, respectively. The first and second connecting members 31 and 32 may be respectively fixed to the first and second terminal 15 and 14 through, for example, welding or soldering.

The first connecting member 31 can be made of one of aluminum, an aluminum alloy, nickel, and a nickel alloy. The first connecting member 31 can be made of the same material as the first terminal 15.

The second connecting member 32 can be made of copper or a copper alloy. The second connecting member 32 can be made of the same material as the second terminal 14.

The first and second connecting members 31 and 32 may be formed with coated wires, first terminals thereof may be fixed to the circuit substrate, and second terminals thereof may be fixed to the first and terminals 15 and 14.

In one embodiment, an insulating member 41 in which a plurality of openings 41a are formed is installed between the first terminal 15 and the first connecting member 31. The insulating member 41 may have a sheet form and may be attached to the first terminal 15.

Here, the insulating member 41 can have a mesh form including a plurality of openings. The insulating member 41 may be made of a polymer material for blocking electricity, and particularly, it can have a tape form having an adhesive layer on a first surface thereof.

An insulating member 42 in which a plurality of openings are formed is installed between the second terminal 14 and the second connecting member 32. In one embodiment, the insulating member 42 has a sheet form and is attached to the second terminal 14.

The insulating member 42 can have a mesh body including a plurality of openings. The insulating member 42 can be made of a polymer material for intercepting electricity. For example, the insulating member 42 can have a tape form having an adhesive layer on a first surface thereof.

Figure 3A:
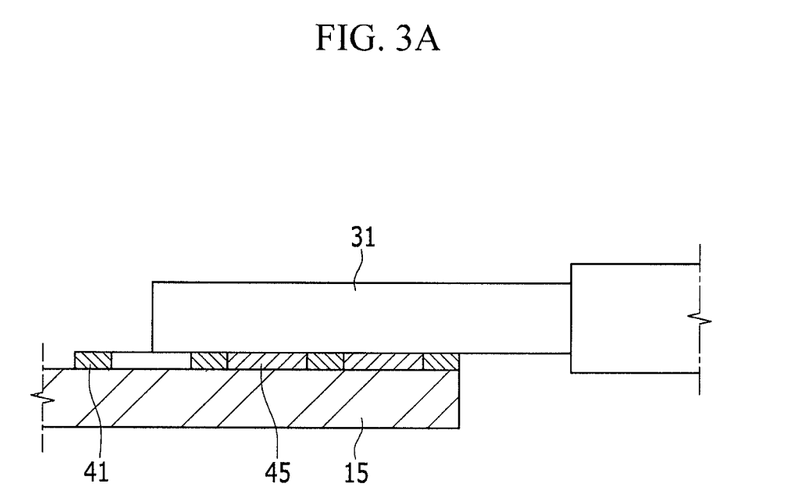
FIG. 3A shows a cross-sectional view of a state in which a connecting member is mounted on a terminal of a rechargeable battery according to one embodiment.

In one embodiment, as shown in FIG. 3A, when the insulating member 41 having a plurality of openings is formed between the first terminal 15 and the first connecting member 31 and the two elements 31 and 15 15 are not fixed through, for example, a soldering material 45, the first connecting member 31 and the first terminal 15 are separated from each other by the insulating member 41, which is indicated as a failure of the test, and the connection status can be detected as unfixed.

In an example in which the insulating member 41 is not installed, when the first connecting member 31 is put on the first terminal 15, the first terminal 15 electrically contacts the first connecting member 31 so it is difficult to check whether the first connecting member 31 and the first terminal 15 are fixed.

Figure 3B:
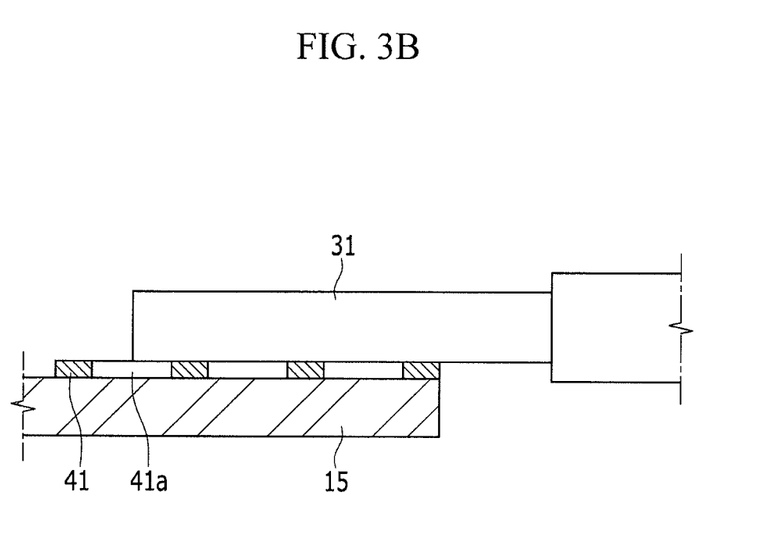
FIG. 3B shows a cross-sectional view of a state in which a terminal of a rechargeable battery and a connecting member are fixed according to one embodiment.

As shown in FIG. 3B, when the first terminal 15 and the first connecting member 31 are fixed through soldering, the first connecting member 31 is stably fixed to the first terminal 15 to detect whether the protective circuit module 30 normally operates.

Figure 4:
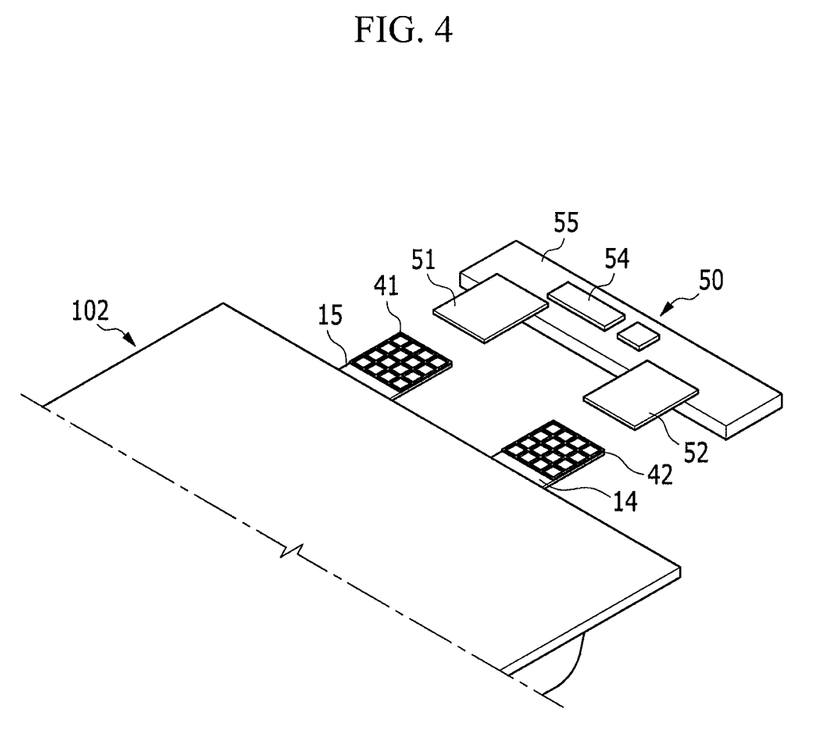
FIG. 4 shows an exploded perspective view of a part of a rechargeable battery according to a second embodiment.

FIG. 4 shows an exploded perspective view of a part of a rechargeable battery according to a second embodiment.

Referring to FIG. 4, the rechargeable battery 102 includes a first terminal 15 and a second terminal 14 that are electrically connected to an electrode assembly, and a protective circuit module 50 including first and second connecting members 51 and 53 respectively connected to the first and second terminals 15 and 14.

The electrode assembly includes first and second electrodes which are electrically connected to the first and second terminals 15 and 14, respectively. Each of the first and second terminals 15 and 14 may have a plate shape.

The protective circuit module 50 includes a substrate 55, an element 54 installed on the substrate, and a first connecting member 51 and a second connecting member 52 fixed to the substrate 55. In one embodiment, at least one of the first and second connecting members 51 and 52 has a plate shape.

In one embodiment, an insulating member 41 having a plurality of openings is installed on the first terminal 15, and an insulating member 42 having a plurality of openings is installed on the second terminal 14. The insulating member 42 can have an adhesive sheet form.

When the terminals 14 and 15 and the connecting members 51 and 52 have a plate shape, the terminals 14 and 15 further easily contact the connecting members 51 and 52 so it is very difficult to detect the fixed states of the connecting members 51 and 52 and the terminals 14 and 15. However, when the insulating members 41 and 42 are installed as in the FIG. 4 embodiment, the connection status of the terminals 14 and 15 and the connecting members 51 and 52 can be easily checked, for example, as fixed or unfixed.

Figure 5:
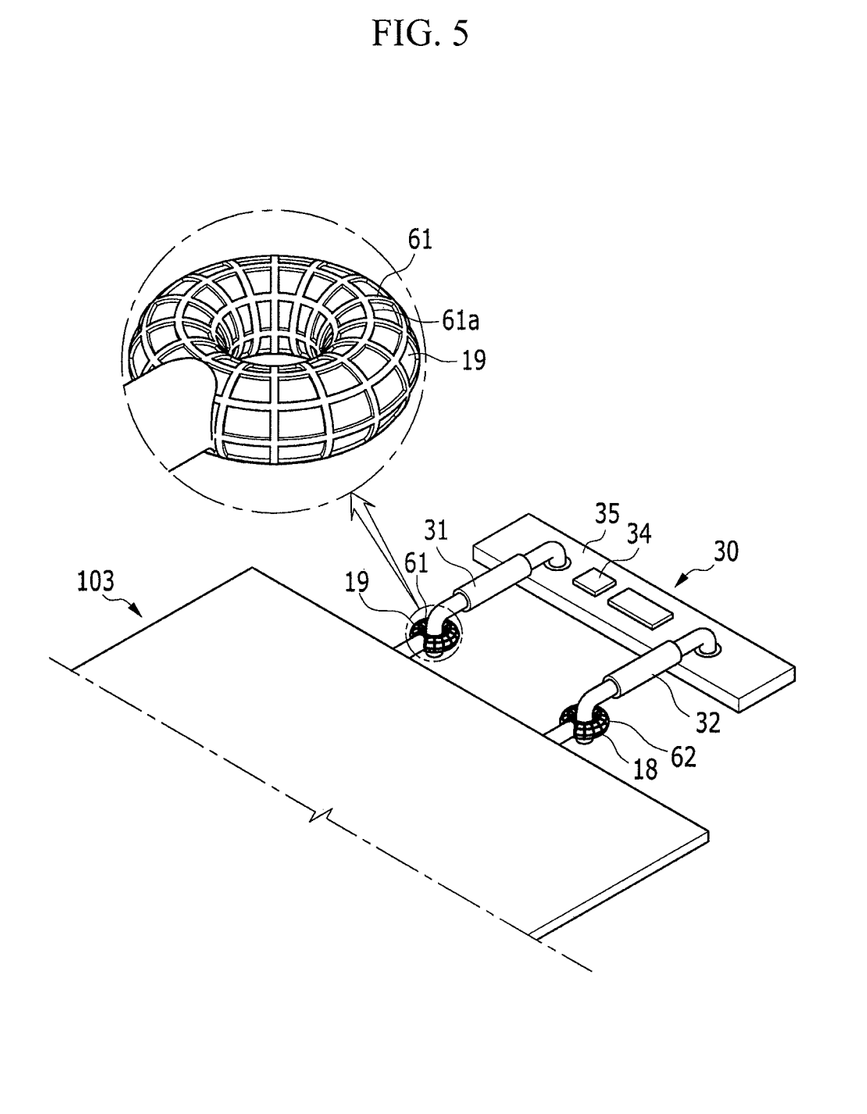
FIG. 5 shows an exploded perspective view of a part of a rechargeable battery according to a third embodiment.

FIG. 5 shows an exploded perspective view of a part of a rechargeable battery according to a third embodiment.

Referring to FIG. 5, the rechargeable battery 103 includes a first terminal 19 and a second terminal 18 that are electrically connected to the electrode assembly, and a protective circuit module 30 having first and second connecting members 31 and 32 respectively connected to the first and second terminals 19 and 18.

The electrode assembly includes first and second electrodes which are electrically connected to the first and second terminals 15 and 14, respectively. Also, at least one of the first and second terminals 19 and 18 has a ring shape having a hole in the center thereof.

The protective circuit module 30 includes a substrate 35, an element 34 installed on the substrate, and the first and second connecting members 31 and 32 fixed to the substrate 35. In one embodiment, at least one of the first and second connecting members 31 and 32 has a wire form. The first and second connecting members 31 and 32 are respectively inserted into the holes of the first and second terminals 19 and 18 and are then fixed through, for example, soldering.

In one embodiment, an insulating member 61 having a plurality of openings 61a is installed on the first terminal 19, and an insulating member 62 having a plurality of openings is installed on the second terminal 18. In one embodiment, the insulating member 62 has an adhesive sheet form, and is attached to a surface of the first terminal 19.

When the insulating members 61 and 62 are installed to the terminals 18 and 19, the connection status of the terminals 18 and 19 and the connecting members 31 and 32 can be readily detected.

Figure 6:
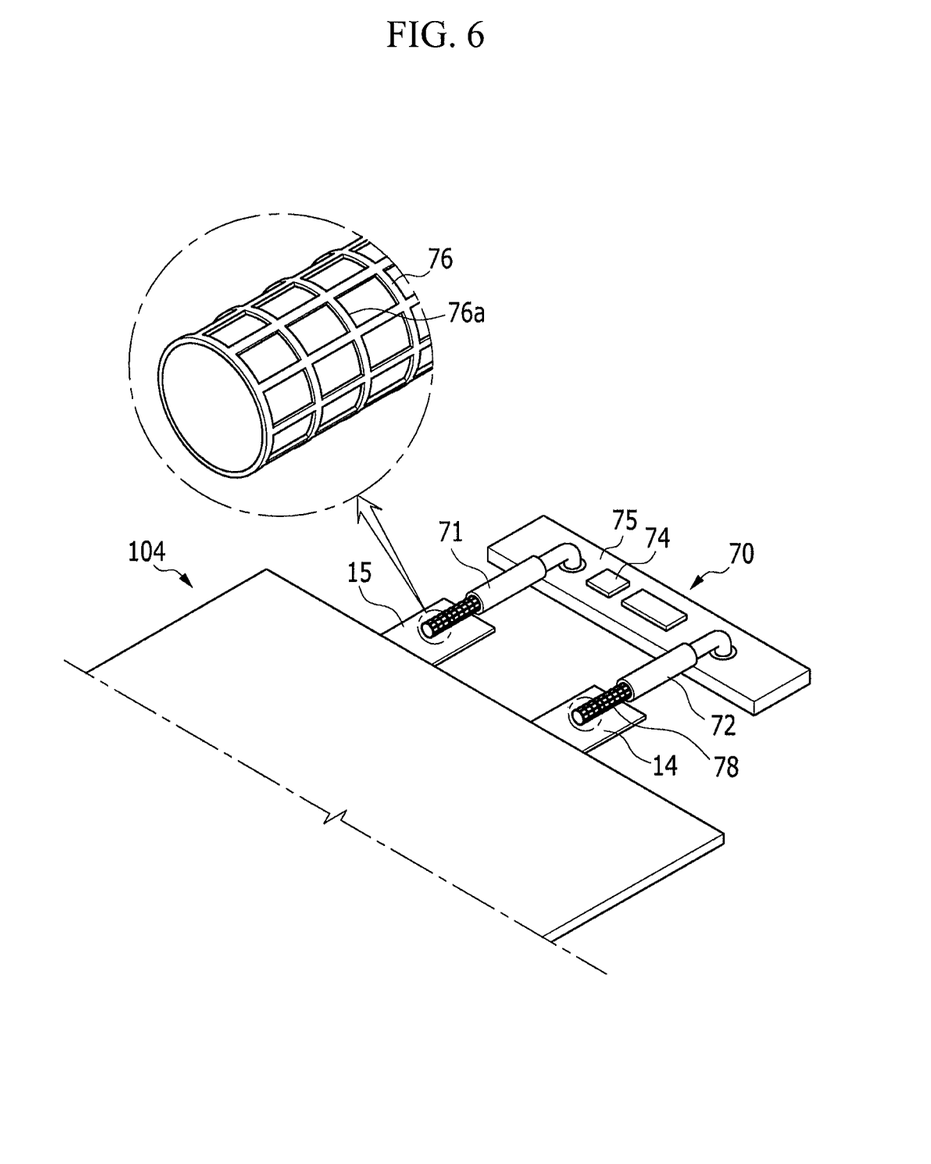
FIG. 6 shows an exploded perspective view of a part of a rechargeable battery according to a fourth embodiment.

FIG. 6 shows an exploded perspective view of a part of a rechargeable battery according to a fourth embodiment.

Referring to FIG. 6, the rechargeable battery 104 includes a first terminal 15 and a second terminal 14 that are electrically connected to the electrode assembly, and a protective circuit module 70 having first and second connecting members 71 and 72 connected to the first and second terminals 15 and 14.

The electrode assembly includes first and second electrodes which are electrically connected to the first and second terminals 15 and 14. At least one of the first and second terminals 15 and 14 may have a plate form.

The protective circuit module 70 includes a substrate 75, an element 74 installed on the substrate 75, and the first and second connecting members 71 and 72 that are fixed to the substrate 75. In one embodiment, at least one of the first and second connecting members 71 and 72 has a wire form. The first and second connecting members 71 and 72 may be respectively fixed to the first and second terminals 15 and 14 through soldering.

In one embodiment, an insulating member 76 having a plurality of openings 76a is installed on the first connecting member 71 and an insulating member 78 having a plurality of openings is installed on the second connecting member 72. The insulating members 76 and 78 may be made of adhesive sheets in the mesh form, and may be attached to the surfaces of the first and second connecting members 71 and 72. The insulating members 76 and 78 may be attached thereto in a circular pipe shape. When the insulating members 76 and 78 are installed according to the FIG. 6 embodiment, the connection status of the terminals 14 and 15 and the connecting members 76 and 78 can be easily checked.

Figure 7:
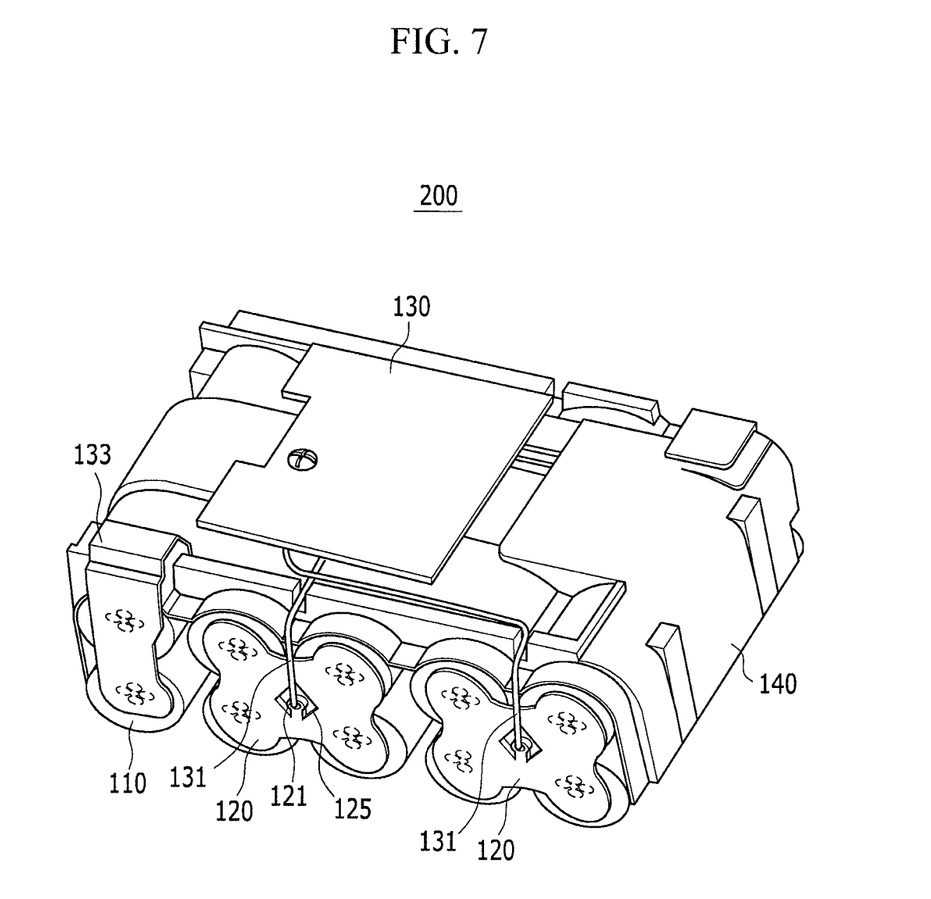
FIG. 7 shows a perspective view of a battery module according to a fifth embodiment.
Figure 8:
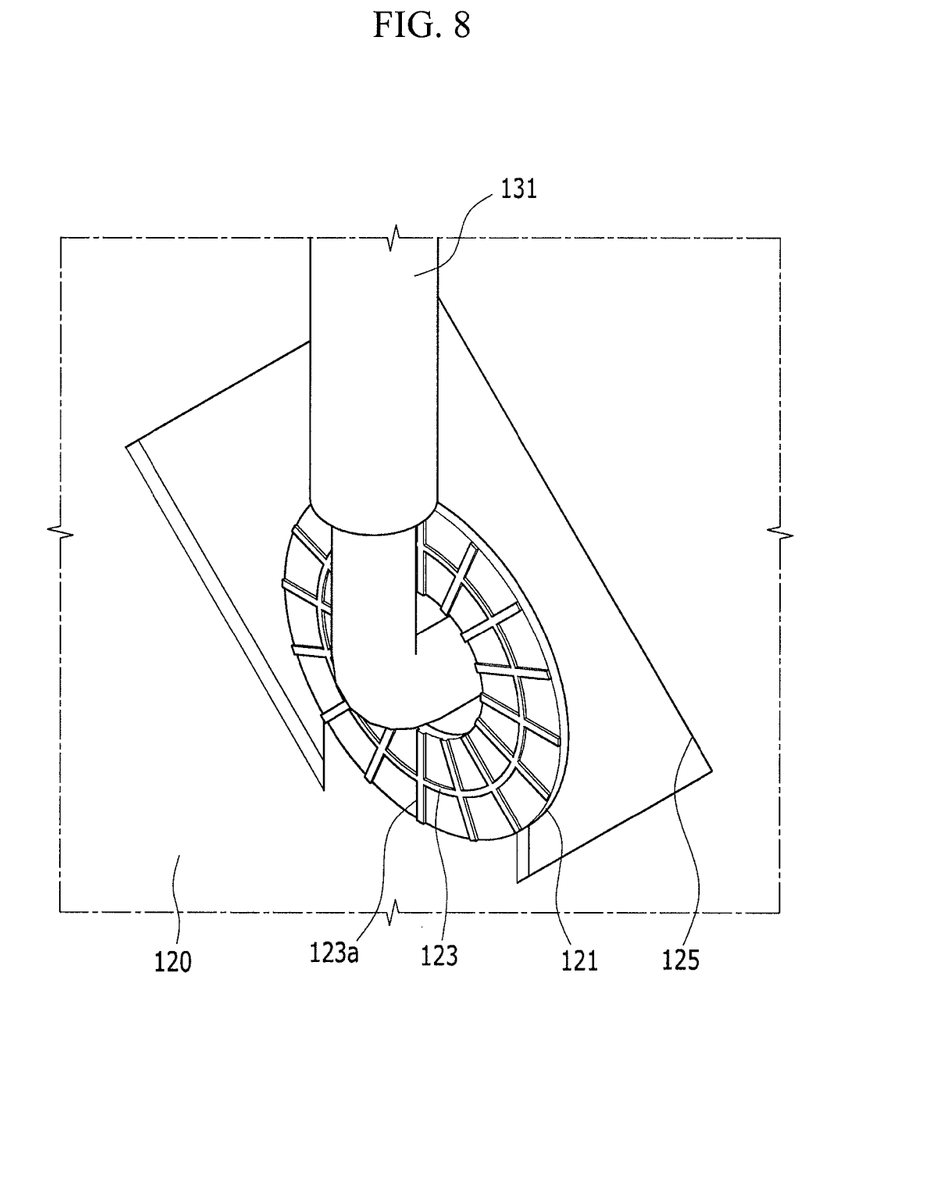
FIG. 8 shows a perspective view of a terminal of a battery module and a connecting member according to a fifth embodiment.

FIG. 7 shows a perspective view of a battery module according to a fifth embodiment and FIG. 8 shows a partial enlarged view of a bus bar according to the fifth embodiment.

Referring to FIG. 7 and FIG. 8, the battery module 200 includes a plurality of rechargeable batteries 110, a bus bar 120 for connecting the rechargeable batteries 110, and a frame 140 for fixing the rechargeable batteries 110.

The rechargeable battery 110 may be coupled in series or parallel to the neighboring rechargeable battery 110 with the bus bar 120 as a medium. In one embodiment, the bus bar 120 electrically connects four rechargeable batteries 110, and a hole 125 is formed in the center of the bus bar 120. The bus bar 133 electrically connects two rechargeable batteries provided on an edge of one side.

A terminal 121 protruded inside the hole 125 is formed in the hole 125. The terminal 121 may have a ring form. The rechargeable batteries 110 are fixed by the frame 140 for wrapping the rechargeable batteries 110.

A protective circuit or a plurality of electrical elements is mounted on the protective circuit module 130 so as to prevent overcharge and over-discharge. Also, a connecting member 131 for electrically connecting the bus bar 120 and the protective circuit module 130 is installed in the protective circuit module 130. The connecting member 131 may have a coated wire form.

In one embodiment, as shown in FIG. 8, the connecting member 131 is inserted into the hole formed in the terminal 121 and is then fixed to the terminal through, for example, soldering. An insulating member 123 having a plurality of openings 123a is installed in the terminal 121. The insulating member 123 may be made of an adhesive sheet in the mesh form, and may be attached to the surface of the terminal 121.

According to the present embodiment, the connecting member 131 is separated from the terminal 121 by the insulating member 123, and they fail to contact each other so the connection status of the connecting member 131 and the terminal 121 can be readily detected during a test.

Figure 9:
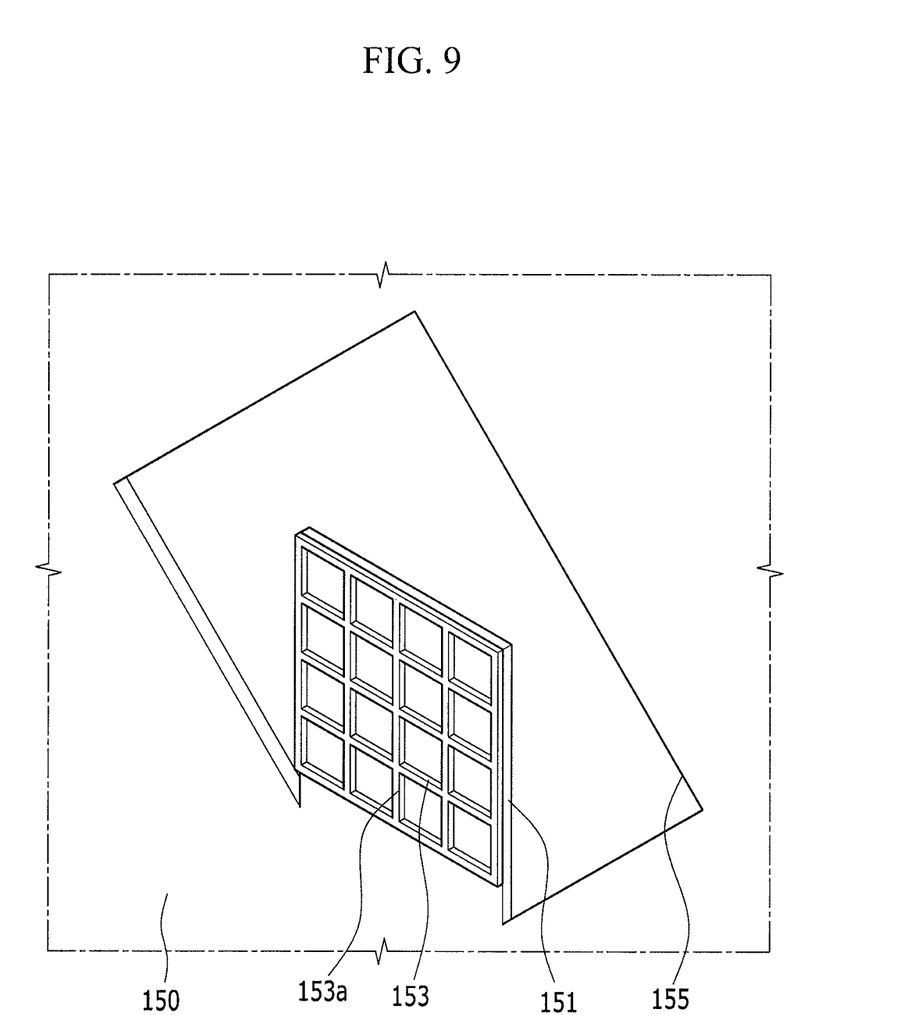
FIG. 9 shows a perspective view of a terminal of a battery module and a connecting member according to a sixth embodiment.

FIG. 9 shows a partial perspective view of a bus bar of a battery module according to a sixth embodiment.

The battery module according to the sixth embodiment has the same configuration as the battery module according to the fifth embodiment except the insulating member so no repeated description will be provided.

A hole 155 is formed in the bus bar 150 for electrically connecting the rechargeable batteries, and a terminal 151 protruded into the hole 155 is formed at the hole 155.

In one embodiment, the terminal 151 has a substantially square plate form, and an insulating member 153 having a plurality of openings 153a is installed on the terminal 151. The insulating member 153 may have an adhesive sheet in the mesh form and may be attached to the surface of the terminal 151.

When the insulating member 153 is installed on the terminal according to the present embodiment, the connection status of the connecting member for electrically connecting the terminal 151 and the protective circuit module terminal can be easily checked.

Figure 10:
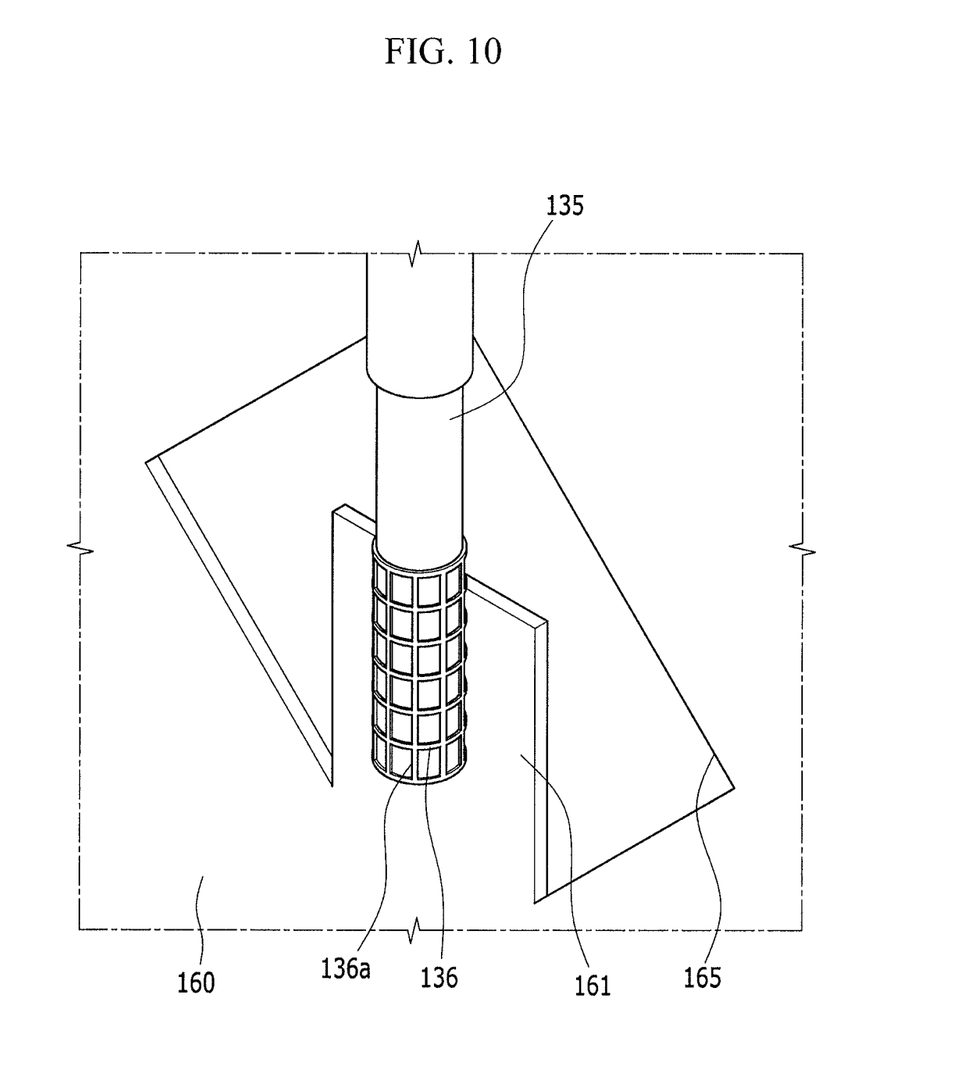
FIG. 10 shows a perspective view of a terminal of a battery module and a connecting member according to a seventh embodiment.

FIG. 10 shows a perspective view of a terminal of a battery module and a connecting member according to a seventh embodiment.

The battery module according to the present embodiment has the same configuration as the battery module according to the fifth embodiment except the configuration of the insulating member, so no repeated description thereof will be provided.

A hole 165 is formed in the bus bar 160 for electrically connecting the rechargeable batteries, and a terminal 161 protruded inside the hole 165 is formed at the hole 165. In one embodiment, the terminal 161 has a substantially square plate form.

In one embodiment, a connecting member 135 for electrically connecting the terminal 161 and the protective circuit module is installed in the terminal 161, and the connecting member 135 has a coated wire form. An insulating member 136 having a plurality of openings 136a is installed in the connecting member 135. The insulating member 136 may be made of an adhesive sheet in the mesh form, and may be attached to the surface of the connecting member 135.

When the insulating member is installed in the connecting member according to the present embodiment, the connection status of the connecting member and the terminal can be readily detected.

According to one of the above disclosed embodiments, the connection status of the protective circuit module and the terminal can be easily checked to accurately detect a defective bonding.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly comprising a positive electrode and a negative electrode, wherein the electrode assembly has a top surface;
   a case accommodating the electrode assembly;
   a terminal electrically connected to the top surface of the electrode assembly and exposed from the case;
   a protective circuit module comprising a connecting member electrically connected to the terminal; and
   an insulating member interposed between the terminal and the connecting member, wherein a plurality of openings are formed in the insulating member, wherein a longitudinal side of the insulating member extends in a direction substantially perpendicular to the top surface of the electrode assembly.

2. The rechargeable battery of claim 1, wherein the insulating member is formed as a mesh.

3. The rechargeable battery of claim 1, wherein the insulating member is formed of a film in which a plurality of openings are formed.

4. The rechargeable battery of claim 1, wherein the terminal has a plate or ring shape.

5. The rechargeable battery of claim 4, wherein the insulating member is attached to the terminal.

6. The rechargeable battery of claim 1, wherein the connecting member has a plate, ring, or rod shape.

7. The rechargeable battery of claim 6, wherein the insulating member is attached to the connecting member.

8. The rechargeable battery of claim 1, wherein the terminal and the connecting member are bonded through welding or soldering.

9. A battery module comprising:
   a plurality of rechargeable batteries;
   a bus bar configured to electrically connect the rechargeable batteries;
   a protective circuit module comprising a connecting member electrically connected to the bus bar; and
   an insulating member interposed between a terminal and the connecting member, wherein a plurality of openings are formed in the insulating member, wherein the terminal surrounds an outer periphery of the insulating member.

10. The battery module of claim 9, wherein the insulating member is formed as a mesh.

11. The battery module of claim 9, wherein the insulating member is formed of a film in which a plurality of openings are formed.

12. The battery module of claim 9, wherein the terminal has a plate or ring shape.

13. The battery module of claim 12, wherein the insulating member is attached to the terminal.

14. The battery module of claim 9, wherein the connecting member has a plate, ring, or rod shape.

15. The battery module of claim 14, wherein the insulating member is attached to the connecting member.

16. The battery module of claim 9, wherein the terminal and the connecting member are bonded through welding or soldering.

17. A rechargeable battery comprising:
an electrode assembly having a top surface;
a terminal extending from the top surface of the electrode assembly;
a protective circuit module comprising a connecting member electrically connected to the terminal; and
an insulating member at least part of which is interposed between the terminal and the connecting member, wherein at least one opening is formed in the insulating member, wherein a longitudinal side of the insulating member extends in a direction substantially perpendicular to the top surface of the electrode assembly.

18. The rechargeable battery of claim 17, wherein the connecting member does not contact part of the opening.

19. The rechargeable battery of claim 17, wherein the terminal and connection member have substantially the same shape.

20. The rechargeable battery of claim 17, wherein a plurality of openings are formed in the insulating member, and wherein a soldering material is formed inside at least part of the openings.

* * * * *